(12) United States Patent
Yu et al.

(10) Patent No.: US 11,217,809 B2
(45) Date of Patent: Jan. 4, 2022

(54) SOLID-STATE FUEL BATTERY AND METHOD FOR MAKING SOLID-STATE ELECTROLYTE

(71) Applicant: Tsinghua University, Beijing (CN)

(72) Inventors: Pu Yu, Beijing (CN); Nian-Peng Lu, Beijing (CN); Jian Wu, Beijing (CN); Shu-Yun Zhou, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 279 days.

(21) Appl. No.: 16/420,150

(22) Filed: May 22, 2019

(65) Prior Publication Data

US 2019/0280322 A1    Sep. 12, 2019

Related U.S. Application Data

(63) Continuation of application No. PCT/CN2017/112665, filed on Nov. 23, 2017.

(30) Foreign Application Priority Data

Nov. 23, 2016    (CN) .......................... 201611046874.6

(51) Int. Cl.
*H01M 8/1246*    (2016.01)
*H01M 4/90*    (2006.01)
(Continued)

(52) U.S. Cl.
CPC ............ *H01M 8/1246* (2013.01); *C01F 1/00* (2013.01); *C01G 51/66* (2013.01); *C01G 51/68* (2013.01);
(Continued)

(58) Field of Classification Search
None
See application file for complete search history.

(56) References Cited

U.S. PATENT DOCUMENTS 6,964,827 B2    11/2005    Barker et al.
7,666,550 B2    2/2010    Chia et al.
(Continued)

FOREIGN PATENT DOCUMENTS

CN    1340213    3/2002
CN    1367546    9/2002
(Continued)

OTHER PUBLICATIONS

International Search Report of PCT/CN2017/112665.
(Continued)

*Primary Examiner* — Jonathan Crepeau

(57) ABSTRACT

A solid-state fuel battery comprises an anode, a cathode spaced from the anode, and a solid-state electrolyte disposed between the anode and the cathode. A material of the solid-state electrolyte is a hydrogen-containing transition metal oxide having a structural formula of $ABO_xH_y$, wherein A is one or more of alkaline earth metal elements and rare-earth metal elements, B is one or more of transition metal elements, x is a numeric value in a range of 1 to 3, and y is a numeric value in a range of 0 to 2.5. A method for making the solid-state electrolyte for the solid-state fuel battery is further provided in the present disclosure.

11 Claims, 14 Drawing Sheets

(51) Int. Cl.
*H01M 8/1213* (2016.01)
*H01M 8/1233* (2016.01)
*H01M 8/124* (2016.01)
*C01F 1/00* (2006.01)
*C01G 51/00* (2006.01)
*H01M 8/12* (2016.01)

(52) U.S. Cl.
CPC .......... *H01M 4/9033* (2013.01); *H01M 8/12* (2013.01); *H01M 8/124* (2013.01); *H01M 8/1213* (2013.01); *H01M 8/1233* (2013.01); *C01P 2002/72* (2013.01); *H01M 2008/1293* (2013.01); *H01M 2300/0071* (2013.01); *Y02E 60/50* (2013.01); *Y02P 70/50* (2015.11)

(56) References Cited

U.S. PATENT DOCUMENTS

| | | | |
|---|---|---|---|
| 2007/0085052 | A1 | 4/2007 | Lee et al. |
| 2014/0128252 | A1* | 5/2014 | Hosono ................ C01G 23/003 502/350 |
| 2014/0234752 | A1 | 8/2014 | Park et al. |

FOREIGN PATENT DOCUMENTS

| | | |
|---|---|---|
| CN | 1574215 | 2/2005 |
| CN | 1740377 | 3/2006 |
| CN | 1776912 | 5/2006 |
| CN | 1934033 | 3/2007 |
| CN | 101136453 | 3/2008 |
| CN | 101515647 | 8/2009 |
| CN | 101624206 | 1/2010 |
| CN | 101918337 | 12/2010 |
| CN | 102132408 | 7/2011 |
| CN | 102683348 | 9/2012 |
| CN | 104022303 | 9/2014 |
| CN | 102282098 | 12/2014 |
| CN | 1903423 | 1/2017 |
| EP | 2793279 | 10/2014 |
| JP | 2009054884 | 3/2009 |
| WO | WO2007046640 | 4/2007 |
| WO | WO2013008705 | 1/2013 |

OTHER PUBLICATIONS

Topotactic Phase Transformation of the Brownmillerite $SrCoO_{2.5}$ to the Perovskite $SrCoO_{3-\delta}$, Jeen, H. et al., Advanced Materials, vol. 25, Sep. 19, 2013, ISSN:0935-9648, pp. 3651-3656.

Bork N et al: "Ab initio charge analysis of pure and hydrogenated perovskites", «Journal of Applied Physics», American Institute of Physics, US, vol. 019, No. 3, Feb. 1, 2011, pp. 33702-33702.

You Zhou et al.: "Strongly correlated perovskite fuel cells", «NATURE», vol. 534, No. 7606, May 16, 2016, pp. 231-232.

Takeshi Yajima et al.: "Epitaxial thin films of $ATiO_3-xH_x$(A=Ba, Sr, Ca) with metallic conductivity", «Journal of The American Chemical Society» vol. 134, May 7, 2012, pp. 8782-8785.

\* cited by examiner

SOLID-STATE FUEL BATTERY AND METHOD FOR MAKING SOLID-STATE ELECTROLYTE

CROSS-REFERENCE TO RELATED APPLICATIONS

This application claims all benefits accruing under 35 U.S.C. § 119 from China Patent Application No. 201611046874.6, filed on Nov. 23, 2016 in the State Intellectual Property Office of China, the content of which is hereby incorporated by reference. This application is a continuation under 35 U.S.C. § 120 of international patent application PCT/CN2017/112665 filed on Nov. 23, 2017, the content of which is also hereby incorporated by reference.

TECHNICAL FIELD

The present disclosure relates to a battery, in particular to a solid-state fuel battery and a method for making a solid-state electrolyte.

BACKGROUND

The fuel battery, which can convert the chemical energy directly into the electric energy, has drawn increasing attention and research in recent years because of advantages such as high energy conversion efficiency, environmentally friendly, and no pollution. Solid oxide fuel cell (SOFC) is a device to convert energy by causing an electrochemical reaction between a combustible gas (such as hydrogen gas, carbon monoxide, and the like) and an oxidizing agent (such as oxygen gas) via an oxide electrolyte so as to generate a direct current. The current SOFC technology has key features such as full solid-state structure, acceptance to a plurality of fuels, and high temperature operability. Duo to these properties, SOFC has the potential to be a high performance, clean, and effective energy converting means. Conventional solid oxide fuel cells generally have relatively high working temperatures, such as temperatures above 1000° C. Some solid oxide fuel cells may have relatively low working temperatures approaching 600° C. However, it is difficult to further decrease the working temperature of the solid oxide fuel cell due to limitations from material properties such as low ion conductivity of an electrolyte of the solid oxide fuel cell at a low temperature. A key factor hampering the further development of the solid oxide fuel cell is how to solve problems of low ion conductivity of the electrolyte and high working temperature required for the electrolyte. Therefore, a key point of the study of the solid oxide fuel cell is to increase the ion conductivity of the electrolyte at the low temperature.

The existence of oxygen vacancy is required for the traditional technology, whether for the oxygen ion SOFC or for the hydrogen ion SOFC. $O_2$ and $H_2$ can be transformed to $O^{2-}$ and $H^+$ after a reduction and an oxidation in the presence of a cathode catalyst or an anode catalyst. Then $O^{2-}$ or $H^+$ is combined with the oxygen vacancy or the oxygen in the lattice to form a M—O bond (wherein M is a metal ion) or a H—O bond, conducted in a media material via a displacement in the lattice or in an equivalent occupied space, and finally arrive at the anode or the cathode to react with $H^+$ or $O^{2-}$ to form $H_2O$. Meanwhile an external electron conduction is accompanied, and all of these constitute the working principle of the fuel cell. An oxide with a relatively high ion conductivity includes $Gd_{0.2}Ce_{0.8}O_{2-\delta}$(GDC), $Y_{0.16}Zr_{0.84}O_{2-\delta}$(YSZ), $BaZr_{0.8}Y_{0.2}O_{3-\delta}$(BZY), $La_{0.9}Sr_{0.1}Ga_{0.8}Mg_{0.2}O_{3-\delta}$(LSGM), and the like. Solid acid is another material with a relatively high ion conductivity, including $CsHSO_4$, $CsH_2PO_4$, $CsHSeO_4$, $Rb_3H(SeO_4)_2$, $(NH_4)_3H(SO_4)_2$, $K_3H(SO_4)_2$, and the like. A large number of H—O bonds exist in the solid acid. With increasing temperature, the solid acid can have a structural transition accompanying the increasing hydrogen ion conductivity. This is mainly because there are several stable configurations resulting from deformation of acid radical hexahedron, so that the H—O bonds are twisted and the hydrogen ion conduction is achieved. It has been recently discovered that $SmNiO_3$, though no oxygen vacancy exists in the lattice, exhibits relatively high hydrogen ion conductivity. However, the principle of the hydrogen ion conduction for $SmNiO_3$ has yet to be studied further. Some other types of the electrolytes, such as metal organic framework (MOF) materials with large ion channels, also have very high ion conductivities. In addition, some special structures can be designed to increase the ion conductivity. For example, $CaF_2/BaF_2$ superlattice, YSZ/STO heterogenous interface, SDC/STO nanorod structure, and LMO nanowire structure can be established to increase the ion conductivity. Besides, the ion conductivity of the electrolyte can also be changed by applying a stress.

Although a variety of methods have been attempted to increase the ion conductivity of the electrolyte, such as the methods as described above, the obtained ion transport capacity and working temperature for the ion conduction still cannot meet the requirements of development of the low temperature fuel cell in practical application. Therefore, how to obtain an electrolyte material with a high ion conductively and a low working temperature is a key problem to be solved currently.

SUMMARY

In view of this, for the problems as described above, a solid-state fuel battery with a relatively low working temperature and a solid-state electrolyte for the solid-state fuel battery are provided.

A solid-state fuel battery includes an anode, a cathode spaced from the anode, and a solid-state electrolyte disposed between the anode and the cathode. A material of the solid-state electrolyte is a hydrogen-containing transition metal oxide having a structural formula of $ABO_xH_y$, wherein A is one or more of alkaline earth metal elements and rare-earth metal elements, B is one or more of transition metal elements, x is a numeric value in a range of 1 to 3, and y is a numeric value in a range of 0 to 2.5.

In one embodiment, the alkaline earth metal elements include Be, Mg, Ca, Sr, and Ba. The rare-earth metal elements include La, Ce, Pr, Nd, Pm, Sm, Eu, Gd, Tb, Dy, Ho, Er, Tm, and Yb. The transition metal elements include Co, Cr, Fe, Mn, Ni, Cu, Ti, Zn, Sc, and V.

In one embodiment, B is transition metal element Co.

In one embodiment, A is alkaline earth metal element Sr.

In one embodiment, x is 2.5 and y is 0 to 2.5.

A method for making the solid-state electrolyte for the solid-state fuel battery as described in above embodiments includes steps of:

S100, providing a transition metal oxide having a structural formula of $ABO_z$, wherein z is greater than or equal to 2 and smaller than or equal to 3;

S200, soaking the transition metal oxide with an ionic liquid, wherein water in the ionic liquid is capable of being decomposed into hydrogen ions and oxygen ions under an action of an electric field; and S300, applying an electric field to the transition metal oxide to cause the hydrogen ions in the ionic liquid to insert into the transition metal oxide.

In one embodiment, the step S100 includes steps of:

S110, providing a substrate;

S120, depositing a film of the transition metal oxide having a structural formula of $ABO_z$ onto a surface of the substrate; and S130, forming a first electrode on a surface of the film of the transition metal oxide.

In one embodiment, the substrate is one of a ceramic substrate, a silicon substrate, a glass substrate, a metal substrate, or a polymer. In the step S120, the film of the transition metal oxide is obtained via an epitaxial growth on the substrate by using a pulsed laser deposition method.

In one embodiment, in the step S130, the first electrode contacts the film of the transition metal oxide to form a bottom electrode.

In one embodiment, the step S300 includes steps of:

S310, providing a second electrode and a power source;

S320, disposing the second electrode to be spaced from the first electrode, and connecting the second electrode and the first electrode electrically and respectively to the power source; and S330, soaking the second electrode with the ionic liquid and applying an electric field in a direction from the second electrode to the first electrode by the power source.

In one embodiment, a structural form of the solid-state electrolyte includes a film, a powder, a polycrystal or monocrystal bulk material, a nano-structure, and a composite material.

In the present disclosure, a novel solid-state fuel battery electrolyte $SrCoO_xH_y$ is made by the method for regulating the gating voltage applied to the ionic liquid. A large number of H ions exist in the $SrCoO_xH_y$, and the Co—O octahedron and the Co—O tetrahedron in this crystal structure are twisted by large angles due to the formation of the H—O bond. In addition, a large number of vacancies exist in this structure to provide space and channels for the torsion of the H—O bonds and the transport of the hydrogen ions. The experimental result of the present disclosure demonstrates that the solid-state fuel battery electrolyte $SrCoO_xH_y$ has a very high hydrogen ion conductivity at a low temperature region (from room temperature to 180° C.). Therefore, the solid-state fuel battery adopting the electrolyte provided in the present disclosure has a relatively high H ion conductivity and lower working temperature.

DETAILED DESCRIPTION

For a clear understanding of the objects, the technical solutions, and advantages of the present disclosure, a solid-state fuel battery and a method for making a solid-state electrolyte of the present disclosure will now be described in detail with reference to the accompanying drawings and embodiments. It is to be understood that the specific embodiments as described herein is merely to illustrate the present disclosure, and is not intended to limit the present disclosure.

Figure 1:
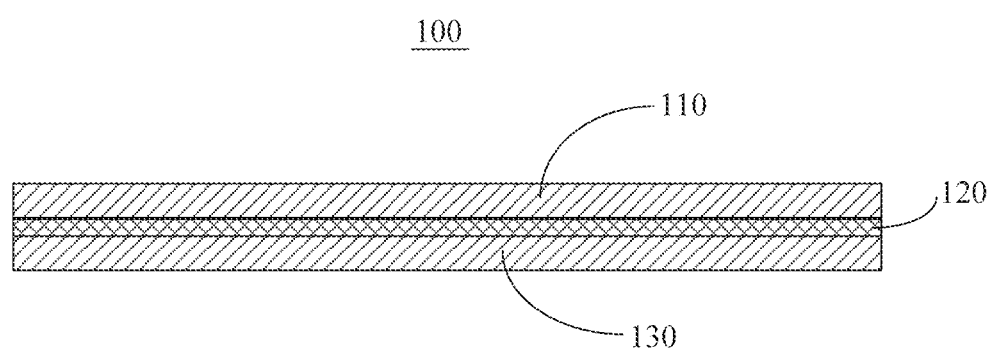
FIG. 1 is a structure schematic diagram of a solid-state fuel battery, provided in embodiments of the present disclosure.

Referring to FIG. 1, embodiments of the present disclosure include a solid-state fuel battery 100, including a cathode 110, an anode 130, and a solid-state electrolyte 120 disposed between the cathode 110 and the anode 130. The cathode 110 and the anode 130 can be any known anode and cathode for the solid-state fuel battery 100. The solid-state electrolyte 120 has a relatively low working temperature and can be worked at a temperature below 200° C.

The solid-state electrolyte 120 is a hydrogen-containing transition metal oxide having a structural formula of $ABO_xH_y$, wherein A is one or more of alkaline earth metal elements and rare-earth metal elements, B is one or more of transition metal elements, x is a numeric value in a range of 1 to 3, and y is a numeric value in a range of 0 to 2.5. Preferably, y is numeric value in a range of 1 to 2.5. A ratio of A and B in $ABO_xH_y$ may not be exactly 1:1, since a deviation from exact 1:1 may have occurred due to vacancies and interstitial atoms commonly found in oxides. Therefore, hydrogen-containing transition metal oxides having ratios of A and B approaching 1:1 are all within the scope of the application. The alkaline earth metal elements can include Be, Mg, Ca, Sr, and Ba. The rare-earth metal elements can include La, Ce, Pr, Nd, Pm, Sm, Eu, Gd, Tb, Dy, Ho, Er, Tm, and Yb. The transition metal elements can include one or more of Co, Cr, Fe, Mn, Ni, Cu, Ti, Zn, Sc, and V. It is to be understood that A also can be an alloy of an alkaline earth metal and a rare-earth metal, and B also can be an alloy of a transition metal and a main group metal.

The hydrogen-containing transition metal oxide $ABO_xH_y$ has a stable crystal structure at a normal temperature, and an addition and a subtraction of hydrogen and an addition and a subtraction of oxygen for the hydrogen-containing transition metal oxide soaked with the ionic liquid can be achieved under an action of an electric field by using a method of regulating an ionic liquid gating voltage at a normal temperature, so as to be able to achieve: a phase transformation from a first phase to a second phase and a phase transformation from the second phase back to the first phase; a phase transformation from the first phase to a third phase and a phase transformation from the third phase to the first phase; and a phase transformation from the second phase to the third phase and a phase transformation from the third phase back to the second phase. The first phase has a lattice volume larger than that of the second phase and the second phase has a lattice volume larger than that of the third phase. It should be understood that a cyclic transformation among the above three phases can be further achieved by the method of regulating the ionic liquid gating voltage. Since the hydrogen-containing transition metal oxide has different physical properties when in the form of the above three phases, an application on an electronic device can be achieved by the transformation among the above three phases. The materials have different molecular formulas in the forms of the three phases. The material in the form of the first phase is the hydrogen-containing transition metal oxide $ABO_xH_y$. The second phase is achieved by extracting hydrogen from or inserting oxygen into the hydrogen-containing transition metal oxide $ABO_xH_y$ by the method of regulating the ionic liquid gating voltage based upon the hydrogen-containing transition metal oxide $ABO_xH_y$. The third phase is achieved by further extracting hydrogen from or inserting oxygen into the hydrogen-containing transition metal oxide $ABO_xH_y$ based on the second phase by the method of regulating the ionic liquid gating voltage based upon the hydrogen-containing transition metal oxide $ABO_xH_y$. In one embodiment, the tri-state phase transformation is to achieve a transformation among three phases $ABO_xH_y$, $ABO_{2.5}$, and $ABO_{3-\delta}$. Meanwhile, the above phase transformation can form a reversible structural transition among three quite different phases under a control of an electric field. Moreover, the three phases have quite different electrical, optical, and magnetic properties. The hydrogen-containing transition metal oxide, a method for making the same, the tri-state phase transformation, and the application of the present disclosure is described in detail as below.

Embodiments of the present disclosure provide a method for making the electrolyte material for the solid-state fuel battery, including steps of:

S100, providing a transition metal oxide having a structural formula of $ABO_z$, wherein z is greater than or equal to 2 and smaller than or equal to 3;

S200, soaking the transition metal oxide with an ionic liquid, wherein water in the ionic liquid is capable of being decomposed into hydrogen ions and oxygen ions; and S300, applying an electric field to the transition metal oxide to cause the hydrogen ions in the ionic liquid to insert into the transition metal oxide and meanwhile cause a part of oxygen ions of the oxide to be extracted out.

In step S100, A is one or more of alkaline earth metal elements and rare-earth metal elements. B is one or more of transition metal elements Co, Cr, Fe, Mn, Ni, Cu, Ti, Zn, Sc, V, and the like. The alkaline earth metal elements can include Be, Mg, Ca, Sr, and Ba. The rare-earth metal elements can include one or more of La, Ce, Pr, Nd, Pm, Sm, Eu, Gd, Tb, Dy, Ho, Er, Tm, and Yb. A form of the transition metal oxide having the structural formula of $ABO_z$ is not limited and can be a film, a powder, a bulk material, a nano-particle, or a material composited with other material. In one embodiment, the transition metal oxide having the structural formula of $ABO_z$ is in form of a film. It is to be understood that a method for making the film of the transition metal oxide is not limited and the film of the transition metal oxide can be made by a variety of methods.

In one embodiment, the step S100 includes steps of:

S110, providing a substrate;

S120, depositing a film of the transition metal oxide having the structural formula of $ABO_z$ onto a surface of the substrate; and S130, forming a first electrode on a surface of the film of the transition metal oxide.

The substrate is not limited and can be one of a ceramic substrate, a silicon substrate, a glass substrate, a metal substrate, or a polymer. A method for forming the film of the transition metal oxide having the structural formula of $ABO_z$ is not limited and can be various film forming methods, such as an ion sputtering method, a chemical vapor deposition method, a magnetron sputtering method, a gelation method, a laser pulse deposition method, etc. In one embodiment, in step S120, the film of the transition metal oxide is obtained via an epitaxial growth on the substrate by using a pulsed laser deposition method. A thickness of the grown film of the transition metal oxide is not limited. Preferably, the film of the transition metal oxide has a thickness from 5 nm to 200 nm. In step S130, the first electrode contacts the film of the transition metal oxide to form a bottom electrode. It is to be understood that the first electrode can be located at a surface of the film of the transition metal oxide closing to the substrate, or located at a surface of the film of the transition metal oxide away from the substrate. The first electrode can be a metal or various conductive films and the film of the transition metal oxide itself. In one embodiment, the first electrode is an ITO film. The ionic liquid can be various types of ionic liquids. In one embodiment, the ionic liquid is DEME-TFSI.

In step S200, one ionic liquid layer can be formed on a surface of the transition metal oxide. The ionic liquid can be various types of ionic liquids, as long as the ionic liquid is able to provide the required hydrogen ions and oxygen ions by hydrolyzing or other manner and cover the transition metal oxide. When the transition metal oxide and the ionic liquid are in an electrical field, the hydrogen ions and the oxygen ions in the ionic liquid can be controlled to be inserted into or otherwise extracted from the transition metal oxide by a direction of the electrical field. A water content in the ionic liquid is not limited. It has been demonstrated by experiment that as long as little water (>100 ppm) is provided in the ionic liquid, the insertion and the extraction of the hydrogen ions and the oxygen ions as described above can be achieved.

It is to be understood that in step S300, a variety of methods can be used to apply the electrical field to the transition metal oxide. In one embodiment, the step S300 includes steps of:

S310, providing a second electrode and a power source;

S320, disposing the second electrode to be spaced from the first electrode and connecting the second electrode and the first electrode electrically and respectively to the power source; and S330, soaking the second electrode with the ionic liquid, and applying an electric field in a direction from the second electrode to the first electrode by the power source.

In step S310, a shape of the second electrode is not limited. The second electrode can be a parallel-plate electrode, a rodlike electrode, or a metal mesh electrode. In one embodiment, the second electrode is an electrode formed by a spring-like metal wire. The power source can be various direct current power sources, alternating current power sources, etc. A voltage of the power source is adjustable so as to be used for controlling a period of a reaction. In one embodiment, the power source is a direct current power source.

In step S320, the second electrode is disposed to be spaced from the first electrode, so that a directed electric field can be formed between the second electrode and the first electrode. Connection manners of the second electrode and the first electrode to the direct current power source are not limited. The application of the voltage to the first electrode and the second electrode can be controlled by a switch.

In step S330, the second electrode is soaked with the ionic liquid. When power is applied to the first electrode and the second electrode, the first electrode can be connected to a negative pole of the direct current power source, and the second electrode can be connected to a positive pole of the direct current power source, so that the electric field in the direction from the second electrode to the first electrode can be generated between the first electrode and the second electrode. Since the ionic liquid exists between the first electrode and the second electrode, the positively charged hydrogen ions in the ionic liquid will move toward the first electrode under the action of the electric field, so the positively charged hydrogen ions are collected on the surface of the film of the transition metal oxide and further inserted into the transition metal oxide, thereby obtaining the hydrogen-containing transition metal oxide. The negatively charged oxygen ions will be extracted from the sample and enter into the ionic liquid. It is to be understood that when the electric field is inverted, the ion change process as described above will also be correspondingly inverted. Therefore, upon the change of the electric field, the process as described above is a reversible process.

A film of strontium cobalt oxide $SrCoO_xH_y$ with different hydrogen contents and oxygen contents can be obtained by the method of regulating the ionic liquid gating voltage. In one embodiment, the hydrogen-containing transition metal oxide $ABO_xH_y$ can be any one of $SrCoO_{2.8}H_{0.82}$, $SrCoO_{2.5}H$, $SrCoO_3H_{1.95}$, and $SrCoO_{2.5}H_{2.38}$.

Figure 2:
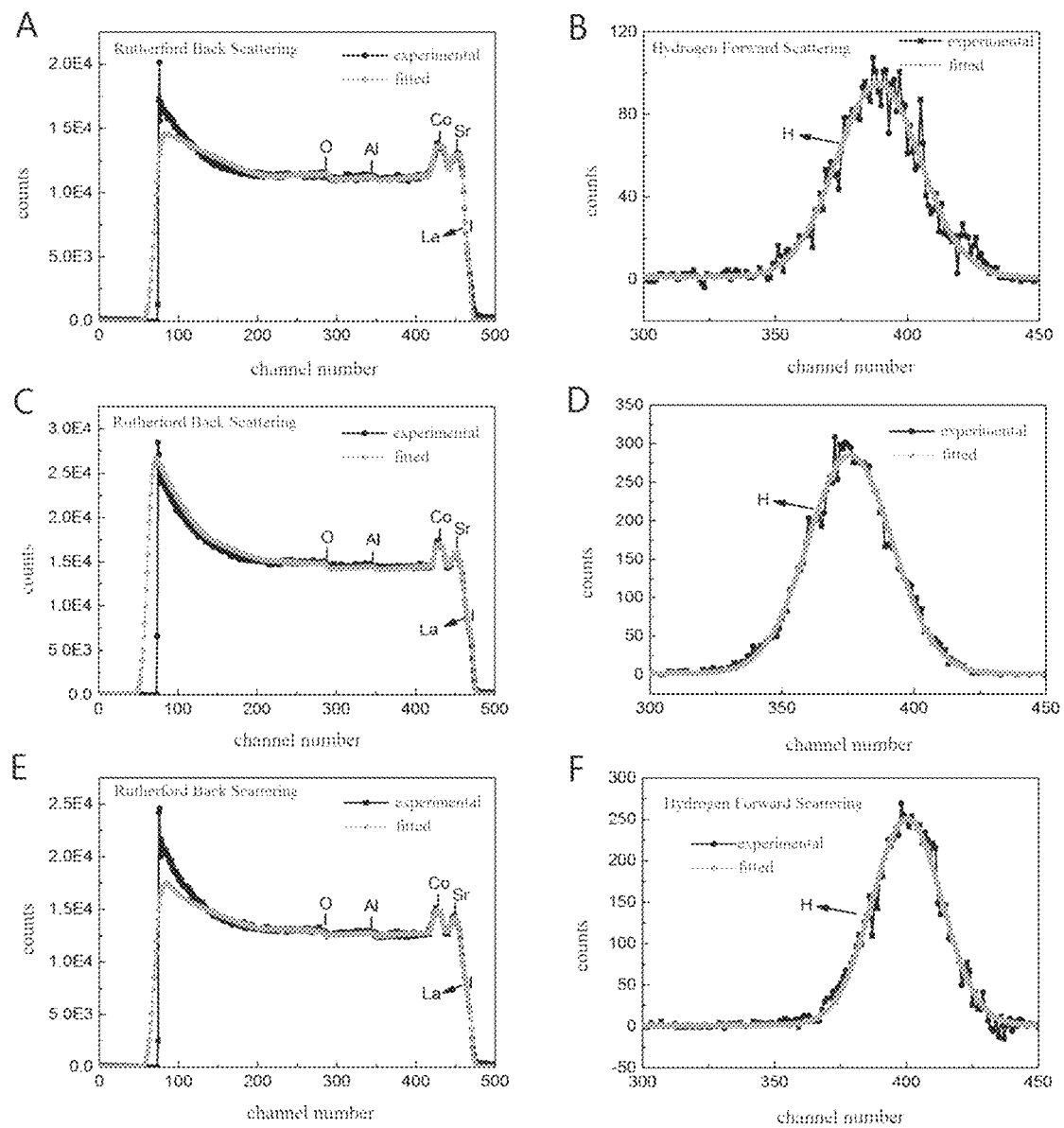
FIG. 2 shows test curves of Rutherford Back Scattering (RBS) and Hydrogen Forward Scattering (HFS) of $SrCoO_{2.8}H_{0.82}$ (A, B), $SrCoO_3H_{1.95}$ (C, D), and $SrCoO_{2.5}H_{2.38}$ (E, F), provided in embodiments of the present disclosure.

Referring to FIG. 2, in order to determine the hydrogen amount and oxygen amount in the $SrCoO_xH_y$ film obtained by the method as described above, hydrogen amounts and oxygen amounts in three types of $SrCoO_xH_y$ films are quantitatively measured by a method combining Hydrogen Forward Scattering with Rutherford Back Scattering. According to the measurement result, obtained ratios of Co atom to H atom in different films are 1:0.82 (FIGS. 2A and 2B), 1:1.95 (FIGS. 2C and 2D), and 1:2.38 (FIGS. 2E and 2F) respectively. Stoichiometric ratios of elements of three types of $SrCoO_xH_y$ are $SrCoO_{2.8}H_{0.82}$, $SrCoO_3H_{1.95}$, and $SrCoO_{2.5}H_{2.38}$ respectively. A topological phase transformation among three quite different phases achieved under a control of an invertible electric field can be provided for all of $SrCoO_{2.8}H_{0.82}$, $SrCoO_3H_{1.95}$, and $SrCoO_{2.5}H_{2.38}$, and these three phases have quite different electrical, optical, and magnetic properties. The hydro-containing transition metal oxide $ABO_xH_y$ can be any one $SrCoO_{2.8}H_{0.82}$, $SrCoO_{2.5}H$, $SrCoO_3H_{1.95}$, and $SrCoO_{2.5}H_{2.38}$.

Taking $SrCoO_{2.5}H$ as an example, a phase transformation among three phases $SrCoO_{2.5}$, $SrCoO_{3-\delta}$, and $SrCoO_{2.5}H$ is described as below, wherein $SrCoO_{2.5}H$ corresponds to a first phase, $SrCoO_{2.5}$ corresponds to a second phase, and $SrCoO_{3-\delta}$ corresponds to a third phase.

Figure 3:
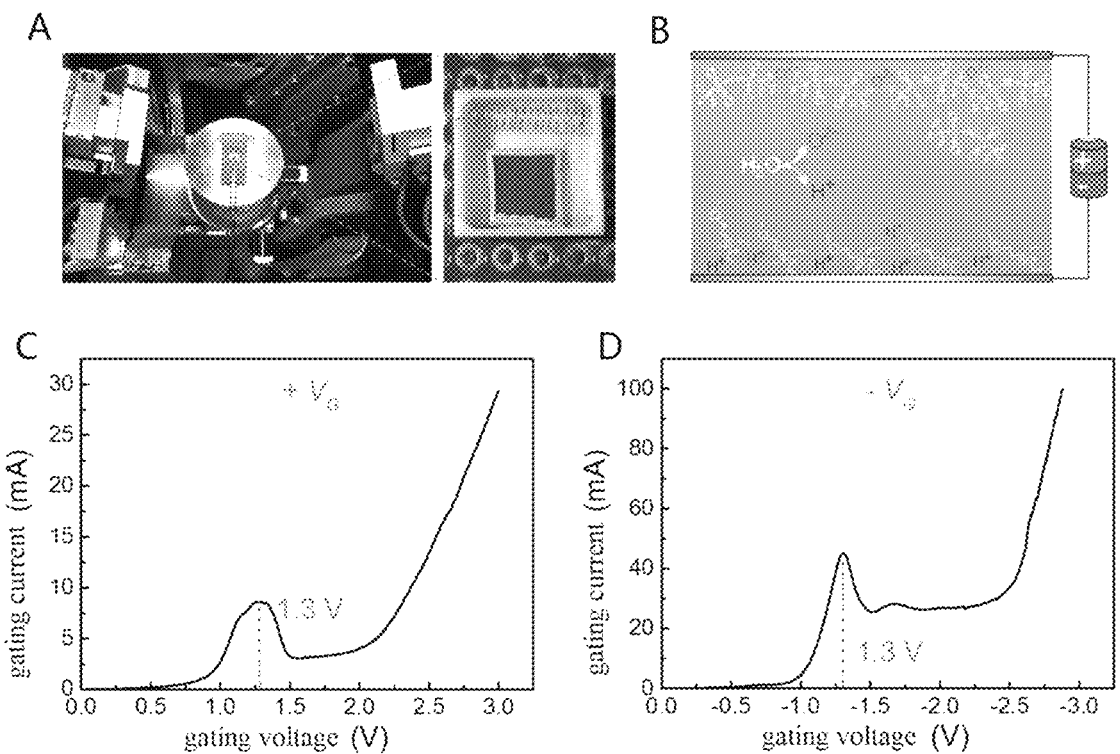
FIG. 3 is a diagram of an apparatus and a principle for a method for regulating an ionic liquid gating voltage, provided in embodiments of the present disclosure.

Referring to FIG. 3, an apparatus for controlling the phase transformation of $SrCoO_{2.5}H$ by a gating voltage is shown. A preparation of a new phase $SrCoO_{2.5}H$ and a reversible and nonvolatile transformation among the three phases under a control of an electric field at room temperature are achieved by using the method of regulating the ionic liquid gating voltage via the apparatus shown in FIG. 3. A silver conductive adhesive is coated as an electrode on an edge of a $SrCoO_{2.5}H$ film and a surface of the $SrCoO_{2.5}H$ film is covered by an ionic liquid. A spiral Pt electrode spaced from the silver conductive adhesive is the other electrode. In the present embodiment, an ionic liquid DEME-TFSI is used, in which the required hydrogen ions and oxygen ions for the phase transformation can be obtained by hydrolyzing a water molecule therein. While this effect can be generalized to other ionic liquids, ionic salts, polymers, polar materials, and so on, as long as the required hydrogen ions and oxygen ions can be obtained therefrom and enabled to be inserted into the material or extracted from the material under a drive of an electric field.

Figure 4:
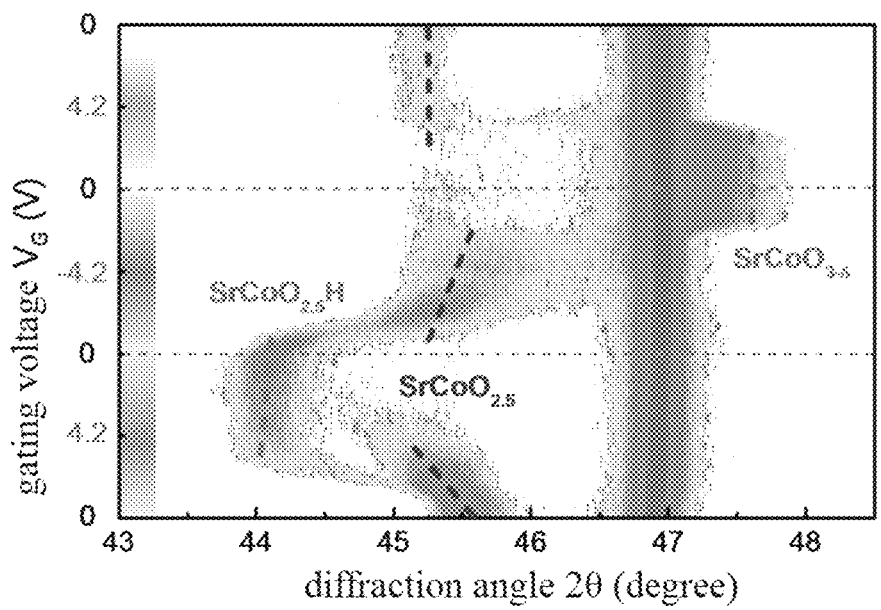
FIG. 4 shows a variation of diffraction peak of XRD in the method of regulating for ionic liquid gating voltage, wherein the corresponding phases are $SrCoO_{2.5}$, $SrCoO_{3-\delta}$, and $SrCoO_{2.5}H$, respectively.

Referring to FIG. 4, this figure shows an in situ XRD of a tri-state phase transformation controlled by the method of regulating the gating voltage. As it can be seen from FIG. 4, in the ionic liquid, when a positive gating voltage (an increasing rate of the voltage is 2 mV/s) is applied to a $SrCoO_{2.5}$ film, the (004) diffraction peak at 45.7° diminishes gradually and eventually disappears, while a diffraction peak corresponding to the new phase starts to develop at 44.0°, suggesting that the new structural phase $SrCoO_{2.5}H$ is obtained. When gradually changing to a negative gating voltage, the new phase $SrCoO_{2.5}H$ reverts back to $SrCoO_{2.5}$ quickly, when further increasing the negative gating voltage, $SrCoO_{2.5}H$ is transformed to a $SrCoO_{3-\delta}$ phase having a perovskite structure. In addition, the structure transition can also be modulated reversibly by regulating the in situ electric field. When changing to positive gating voltages, $SrCoO_{3-\delta}$ phase reverts back to $SrCoO_{2.5}$ phase and $SrCoO_{2.5}H$ quickly. Therefore, a reversible structure transition among the $SrCoO_{2.5}$ phase having the brownmillerite structure, the $SrCoO_{3-\delta}$ phase having the perovskite structure, and the $SrCoO_{2.5}H$ phase is achieved by controlling the electric field. An important feature is that these regulated new phases are nonvolatile, that is, when the electric field is removed, their structural phases and respective physical properties are still kept.

Figure 5:
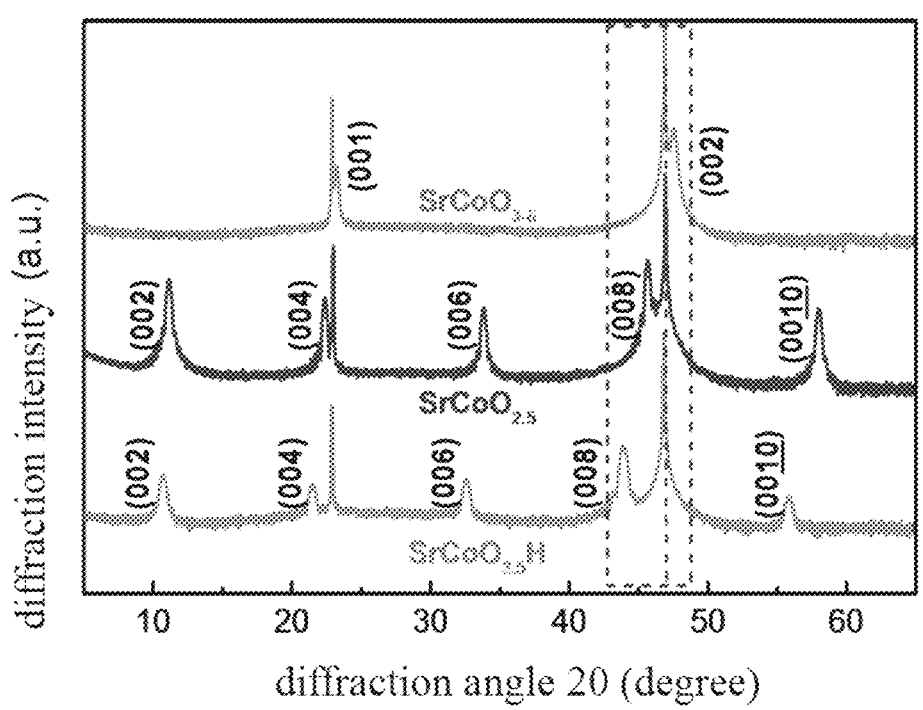
FIG. 5 shows structural characterization spectra of X-ray diffraction of $SrCoO_{2.5}$, $SrCoO_{3-\delta}$, and $SrCoO_{2.5}H$, provided in embodiments of the present disclosure.
Figure 6:
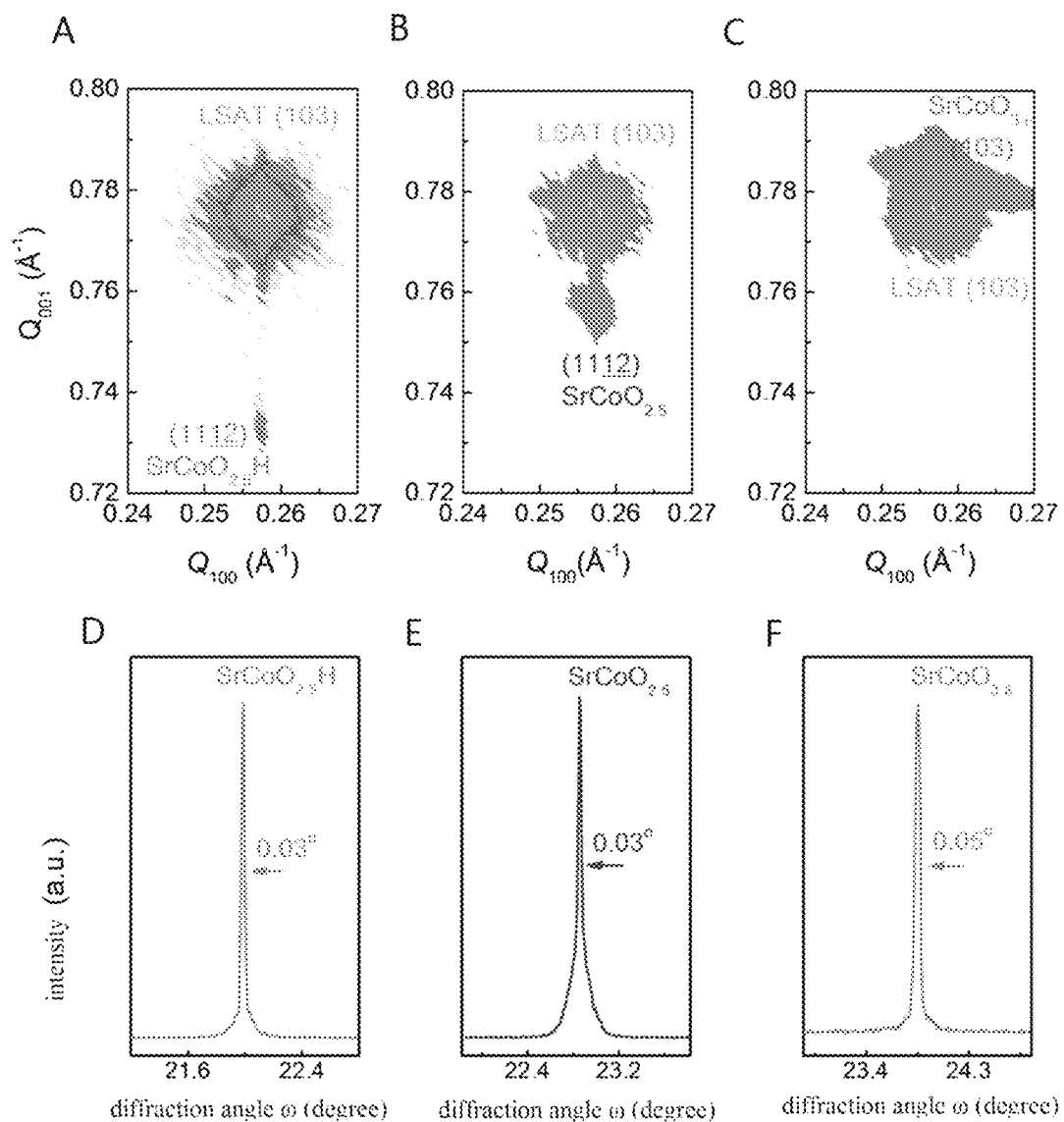
FIG. 6 shows a characterization of the crystal quality of a film before and after the regulation to the ionic liquid gating voltage, provided in embodiments of the present disclosure.
Figure 7:
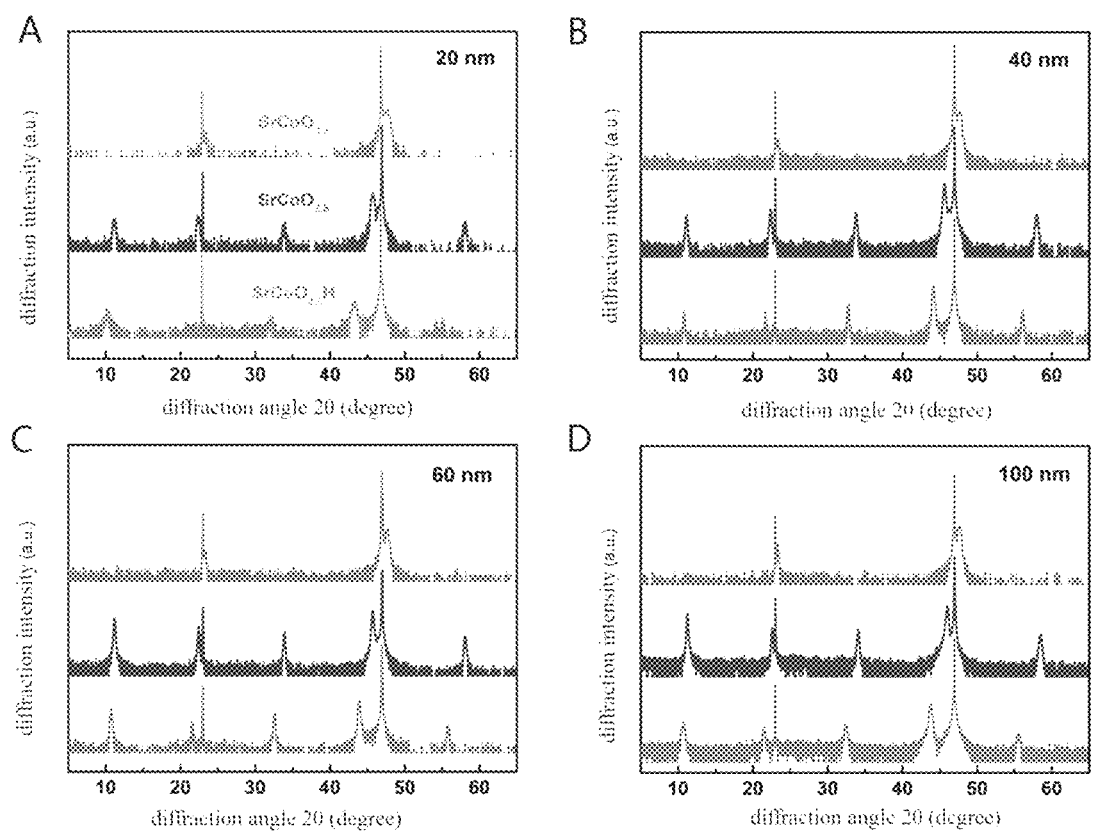
FIG. 7 shows XRD of three structural phases with different thicknesses, (A) 20 nm, (B) 40 nm, (C) 60 nm, and (D) 100 nm, respectively, provided in embodiments of the present disclosure.
Figure 8:
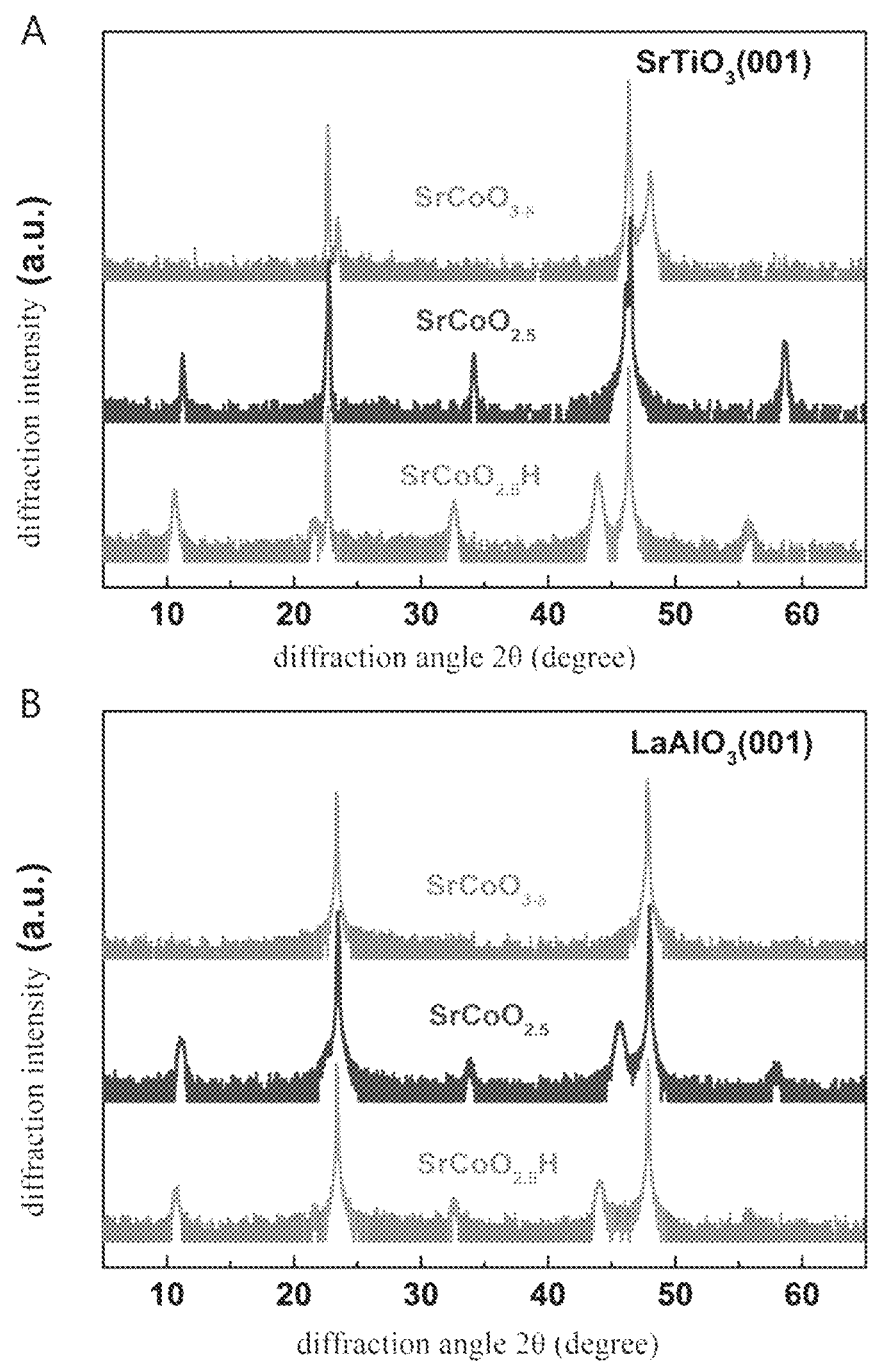
FIG. 8 shows ex-situ XRD results of the $SrCoO_{2.5}$ phase on substrates with different stresses, $SrTiO_3$ (001) (A) and $LaAlO_3$ (001) (B), after the regulation to the ionic liquid gating voltage, provided in embodiments of the present disclosure.

Referring to FIG. 5, X-ray diffraction patterns of three phases $SrCoO_{2.5}$, $SrCoO_{3-\delta}$, and $SrCoO_{2.5}H$ are shown. In comparison with the $SrCoO_{3-\delta}$ phase having the perovskite structure, the $SrCoO_{2.5}$ phase having the brownmillerite structure exhibits a series of superstructure peaks derived from an alternating arrangement of oxygen octahedron and oxygen tetrahedron in an out-of-plane direction. Pseudocubic c-axis lattice constants of $SrCoO_{2.5}$ and $SrCoO_{3-\delta}$ structures are respectively 0.397 nm and 0.381 nm based upon respective Bragg diffraction angles, which is also in consistence with the previous study. The new phase $SrCoO_{2.5}H$ also has a series of superstructure diffraction peaks, suggesting that the $SrCoO_{2.5}H$ structure has a long range periodic lattice structure the same as the $SrCoO_{2.5}$ structure. The new phase $SrCoO_{2.5}H$ has a c-axis lattice constant of 0.411 nm which increases by 3.7% and 8.0% respectively compared to these of $SrCoO_{2.5}$ and $SrCoO_{3-\delta}$. In addition, referring to FIG. 6, the three phases $SrCoO_{2.5}$, $SrCoO_{3-\delta}$, and $SrCoO_{2.5}H$ have almost the same rocking curve full width at half maximum (FWHM) and in-plane lattice constant identical to the substrate (in-plane Q values of reciprocal spaces are consistent), suggesting that the films after the in situ growth and gating voltage controlling still remain of high crystalline quality. Furthermore, referring to FIG. 7 and FIG. 8, films with different thicknesses (from 20 nm to 100 nm) grown on LSAT(001) and films with different stresses grown on STO(001) and LAO(001) substrates are provided, and similar results are obtained, which fully demonstrates the effectiveness and intrinsic nature of the reversible tri-state phase transformation among the three phases $SrCoO_{2.5}$, $SrCoO_{3-\delta}$, and $SrCoO_{2.5}H$. That is, this effect has no connection with a stress and a thickness or a dimension of a material and can be generalized to material systems of various structural forms.

Figure 9:
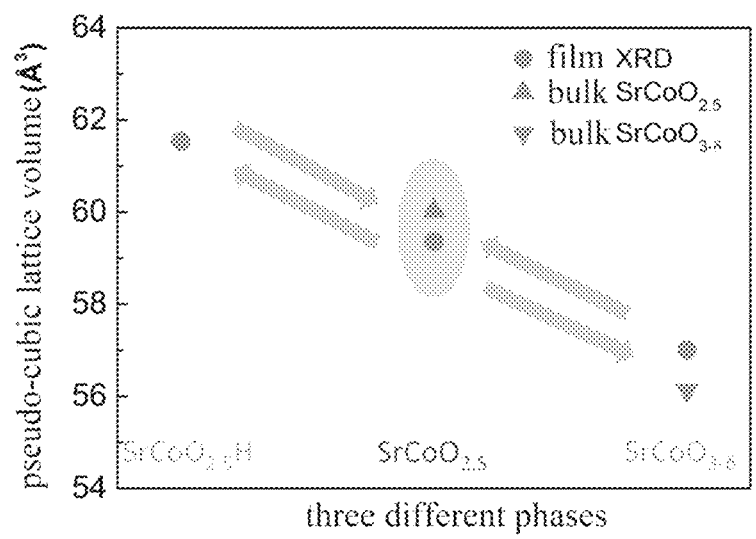
FIG. 9 shows pseudo-cubic lattice volumes obtained from XRD corresponding to the three structural phases, provided in embodiments of the present disclosure.

Referring to FIG. 9, a comparison of lattice volumes of the three structures obtained from XRD measurements with known bulk materials $SrCoO_3$ and $SrCoO_{2.5}$ is shown. It can be seen from FIG. 9 that the lattice volume of the first phase is greater than the lattice volume of the second phase, and the lattice volume of the second phase is greater than the lattice volume of the third phase.

Figure 10:
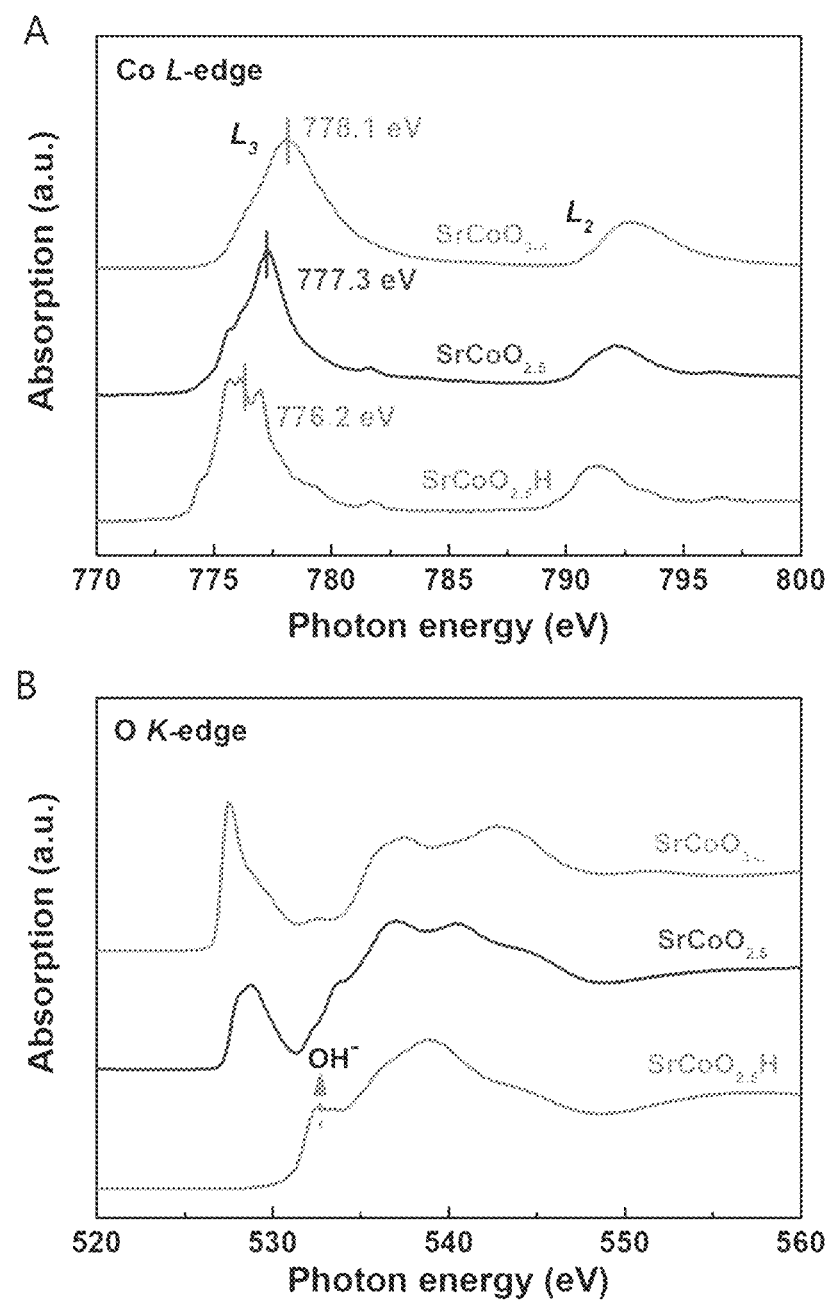
FIG. 10 shows absorption spectroscopies at an L-edge of Co (A) and at a K-edge of O (B) of the three structural phases, $SrCoO_{2.5}$, $SrCoO_{3-\delta}$, and $SrCoO_{2.5}H$, provided in embodiments of the present disclosure.

Referring to FIG. 10, the X-ray absorption spectroscopy at the L-absorption edge of Co and K-absorption edge of O in each of the three phases $SrCoO_{2.5}$, $SrCoO_{3-\delta}$, and $SrCoO_{2.5}H$ is measured in order to thoroughly understand the electronic structure of the new phase $SrCoO_{2.5}H$. A transition of an electron of Co from 2p orbital to 3d orbital is detected at L2,3-absorption edge of Co and can be the basis for determining a valence state of corresponding compound. As shown in FIG. 10A, the peak positions of the L-absorption edges of Co are gradually shifted toward high-energy end from the new phase $SrCoO_{2.5}H$ to the $SrCoO_{2.5}$ phase and then to the $SrCoO_{3-\delta}$ phase, suggesting an gradual increase in valence states of Co. In particular, the new phase $SrCoO_{2.5}H$ has almost the same absorption spectroscopy characteristics, shape of the spectroscopy and peak position, as these of CoO, which suggests that Co in the new phase $SrCoO_{2.5}H$ has a valence state of +2. At the same time, the X-ray absorption spectroscopy of Co in the $SrCoO_{2.5}$ phase is also well in conformity with the previous studies, that is, Co in the $SrCoO_{2.5}$ phase is +3 valent. The peak position of the L3-absorption edge of Co in the $SrCoO_{3-\delta}$ phase is about 0.8 eV larger than that of the $SrCoO_{2.5}$ phase, suggesting that less oxygen vacancy ($\delta<0.1$) is possessed in the $SrCoO_{3-\delta}$ phase. In addition, the electronic states of the three phases are further studied by measuring K absorption spectroscopies of O (FIG. 10B), in which K absorption of O is to measure a transition between 1 s occupied orbital of O and unoccupied 2p orbital of O. Compared with K-absorption edge of O in $SrCoO_{3-\delta}$, in the $SrCoO_{2.5}$ phase, the peak position at 527.5 eV is significantly weaken and the peak position at 528.5 eV is significantly enhanced, suggesting a transformation thereof from a complete oxygen octahedral coordination to a partial oxygen octahedral and partial oxygen tetrahedral coordination. However, in the new phase, the absorption peak at 528 eV completely disappeared, suggesting that the oxygen-cobalt hybridization has been suppressed to a great extent.

Figure 11:
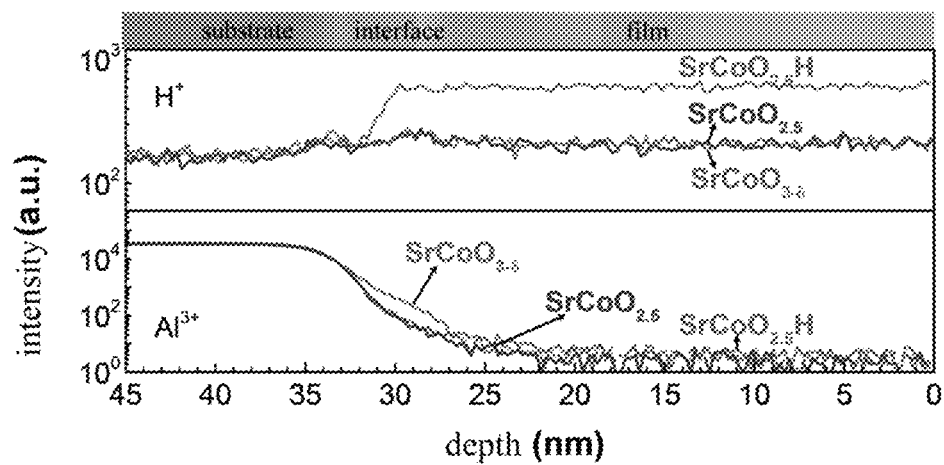
FIG. 11 shows depth dependent relationships of concentrations of H atom and Al atom in the three structural phases, $SrCoO_{2.5}$, $SrCoO_{3-\delta}$, and $SrCoO_{2.5}H$, measured by a secondary-ion mass spectrometry, provided in embodiments of the present disclosure.

Referring to FIG. 11, to verify the insertion of the hydrogen ions into the $SrCoO_{2.5}$ lattice, depth dependent curves of H elements and Al elements (from the LSAT substrate) in the three phases are measured by a secondary-ion mass spectrometry method. Compared to the LSAT substrate and the other two phases, a significant H signal in the new phase clearly verifies that a large amount of hydrogen atoms have been inserted into the $SrCoO_{2.5}$ lattice and are uniformly distributed in the new phase. According to the test of absorption spectroscopy as described above again, the experimental evidence can determine that the Co ion has a valence state of +2, therefore, it is determined that the new phase has a structural formula of $SrCoO_{2.5}H$. In addition, a strong adsorption peak at 532.5 eV in K-adsorption edge of O (FIG. 10B) is resulted from O—H bond, which provides a powerful evidence for the presence of $H^+$ ion in the new phase.

Figure 12:
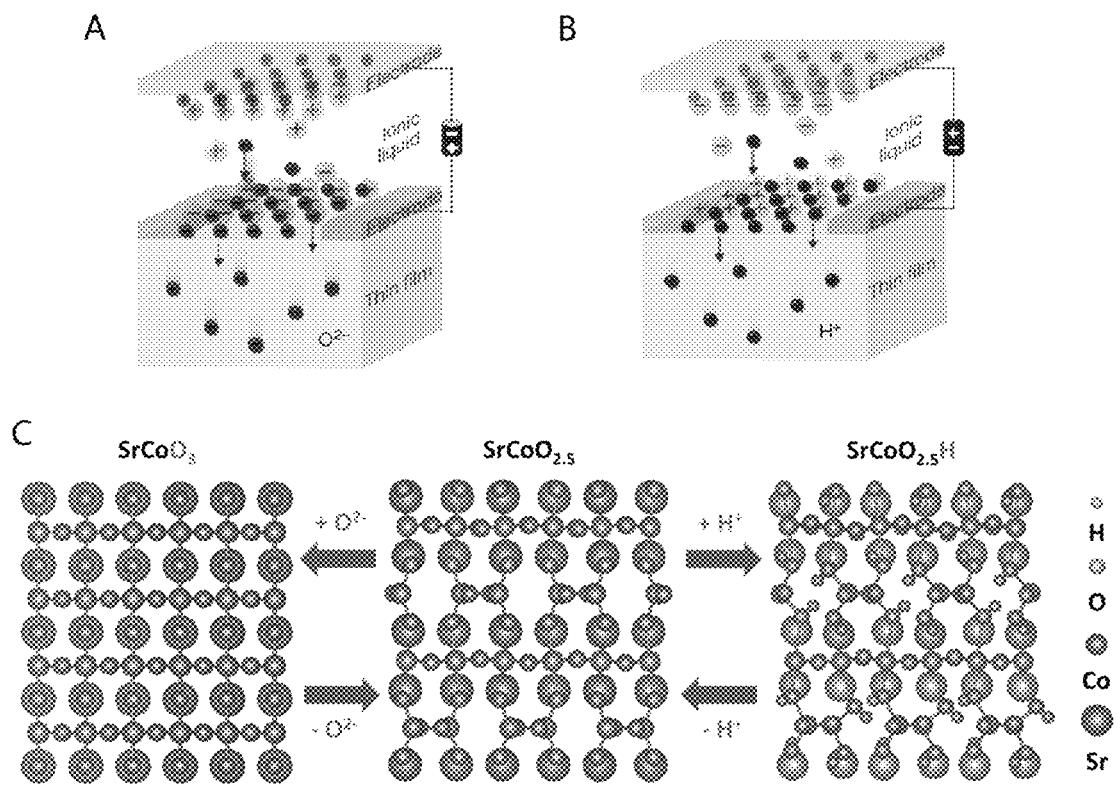
FIG. 12 shows a method for making a new phase $ABO_xH_y$, and a regulating method among three phases, provided in embodiments of the present disclosure.

Referring to FIG. 12, a process of regulating the ionic liquid gating voltage and a reversible regulation thereof to the three phases are summarized. In this structure, $SrCoO_3$ has a perovskite structure, in which the Co ion is surrounded by oxygen ions to form an oxygen octahedral structure. $SrCoO_{2.5}$ has a brownmillerite structure. An alternating arrangement of an octahedron and a tetrahedron is formed by the material because every two Co ions lose one oxygen ion compared with $SrCoO_3$. While in $SrCoO_{2.5}H$, the hydrogen ion is connected to the oxygen ion in the oxygen tetrahedron to form a OH bond. A reversible structural transition among these three structures can be achieved by the insertion and extraction of the oxygen ions and the hydrogen ions under a drive of an electric field.

Figure 13:
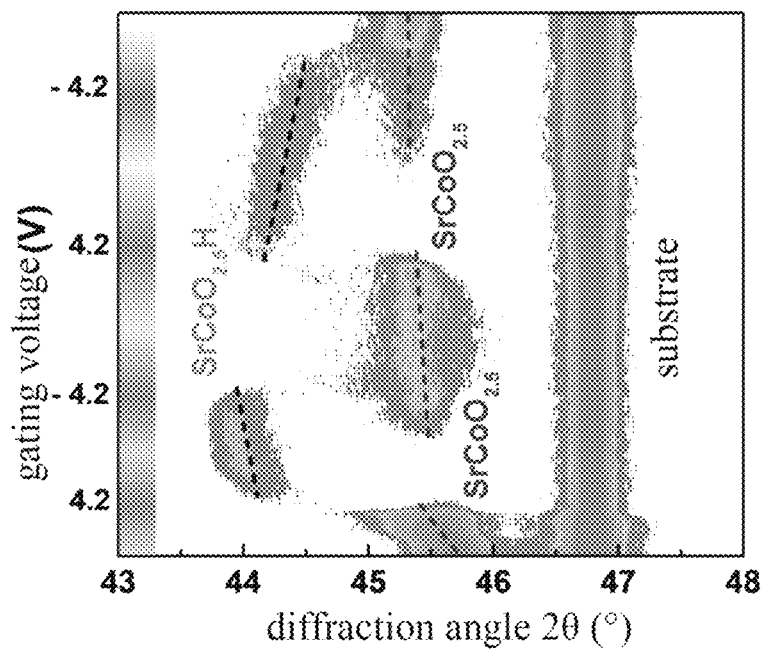
FIG. 13 shows a reversible phase transformation between the $SrCoO_{2.5}$ phase and the $SrCoO_{2.5}H$ phase controlled by the gating voltage, provided in embodiments of the present disclosure.

FIG. 13 shows the hydrogen-containing transition metal oxide having the structural formula of $ABO_xH_y$. The reversible phase transformation between two phases, $SrCoO_{2.5}$ and $SrCoO_{2.5}H$, are performed for several times by regulating the gating voltage. The phase transformation from the $SrCoO_{2.5}$ phase to the $SrCoO_{2.5}H$ phase is induced by a positive gating voltage, while the phase transformation from the $SrCoO_{2.5}H$ phase to the $SrCoO_{2.5}$ phase is induced by a negative gating voltage.

Figure 14:
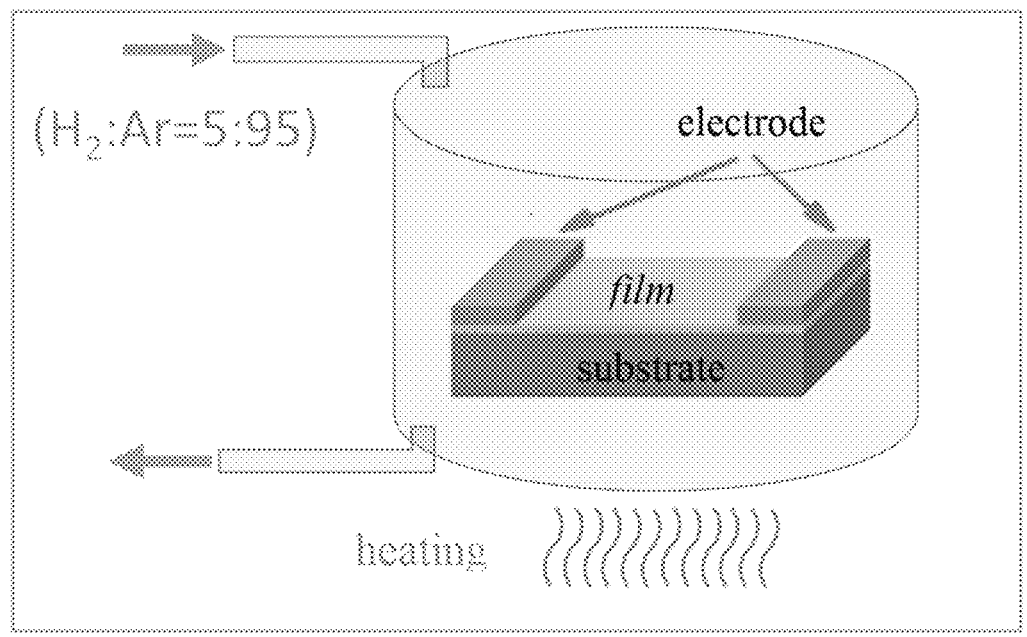
FIG. 14 is a schematic diagram of an apparatus for measuring an ion conductivity of $ABO_xH_y$ as a solid-state electrolyte in the solid-state fuel battery, provided in embodiments of the present disclosure.

FIG. 14 is a diagram shows an experimental apparatus for measuring the ion conductivity of the solid-state electrolyte hydrogen-containing transition metal oxide $ABO_xH_y$. A platinum or palladium electrode is deposited on a sample of a film of the hydrogen-containing transition metal oxide $ABO_xH_y$ grown on a substrate. A gas mixture of $H_2$ and Ar with a ratio of 5:95 or 10:90 is introduced into the apparatus. A Nyquist curve of the sample is measured by heating the sample and the ion conductivity can be obtained from the Nyquist curve.

Figure 15:
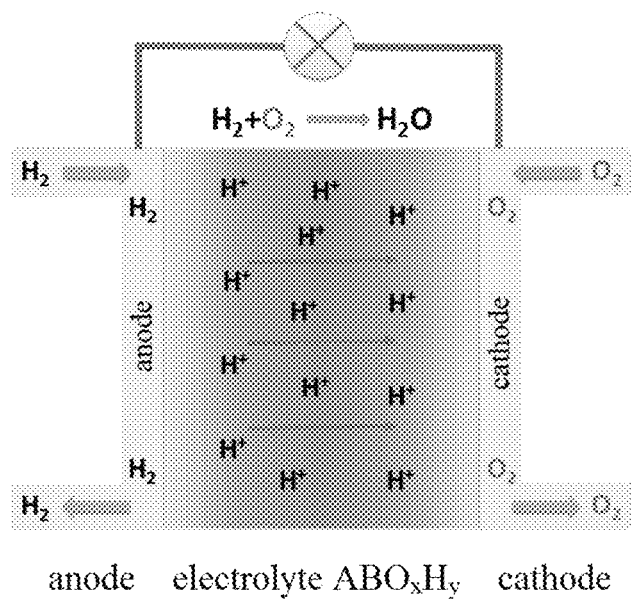
FIG. 15 is a structure schematic diagram of $ABO_xH_y$ applied in a proton solid oxide fuel battery and a solid-state electrolyte, provided in embodiments of the present disclosure.

FIG. 15 is a schematic diagram of a working principle of a proton solid-state oxide fuel battery with the hydrogen-containing transition metal oxide $ABO_xH_y$ as the solid-state electrolyte. A combustible gas (such as $H_2$) of the negative electrode (anode) is introduced to the platinum or palladium electrode having a mesoporous structure and decomposed into $H^+$ under a catalytic action of the platinum or palladium electrode, electrons are released at the same time, $H^+$ are diffused toward the positive electrode (cathode) under an action of a concentration gradient and reacted with $O^{2-}$ ions that entered into the positive electrode (cathode) after a catalyzation to generate water.

Figure 16:
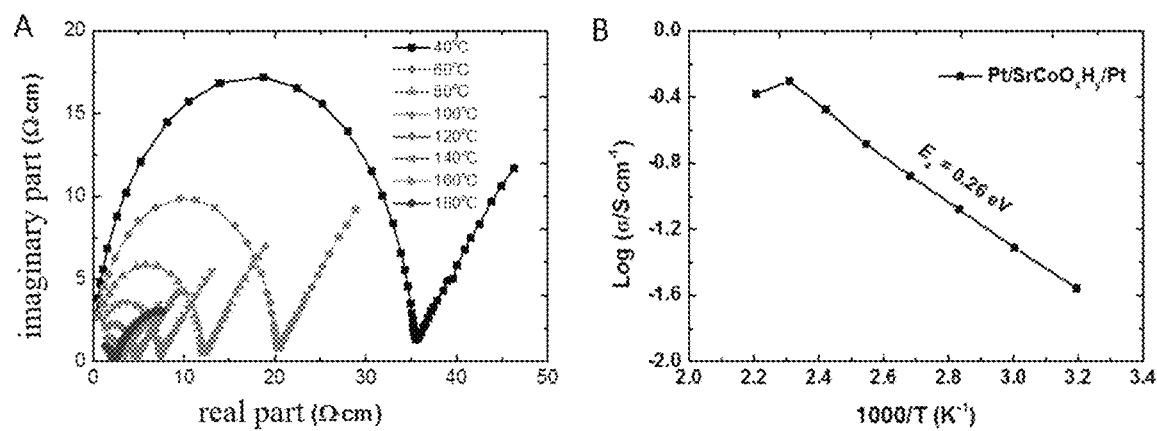
FIG. 16 shows Nyquist plots of the impendence spectra for $ABO_xH_y$ measured at different temperatures and corresponding ion conductivities, provided in embodiments of the present disclosure.
Figure 17:
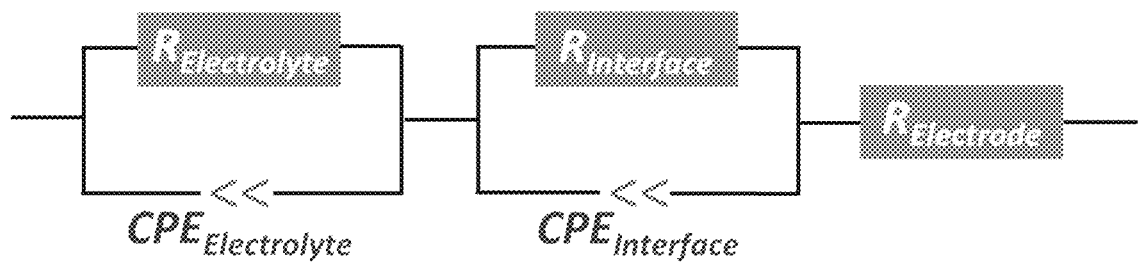
FIG. 17 shows an equivalent circuit corresponding to the impendence spectra measurement for $ABO_xH_y$, provided in embodiments of the present disclosure.

FIG. 16 shows test curves of impendence spectra for $SrCoO_xH_y$ (FIG. 16A), after fitting with an equivalent circuit (FIG. 17), the ion conductivity of $H^+$ ion in the $SrCoO_xH_y$ is obtained (FIG. 16B).

Figure 18:
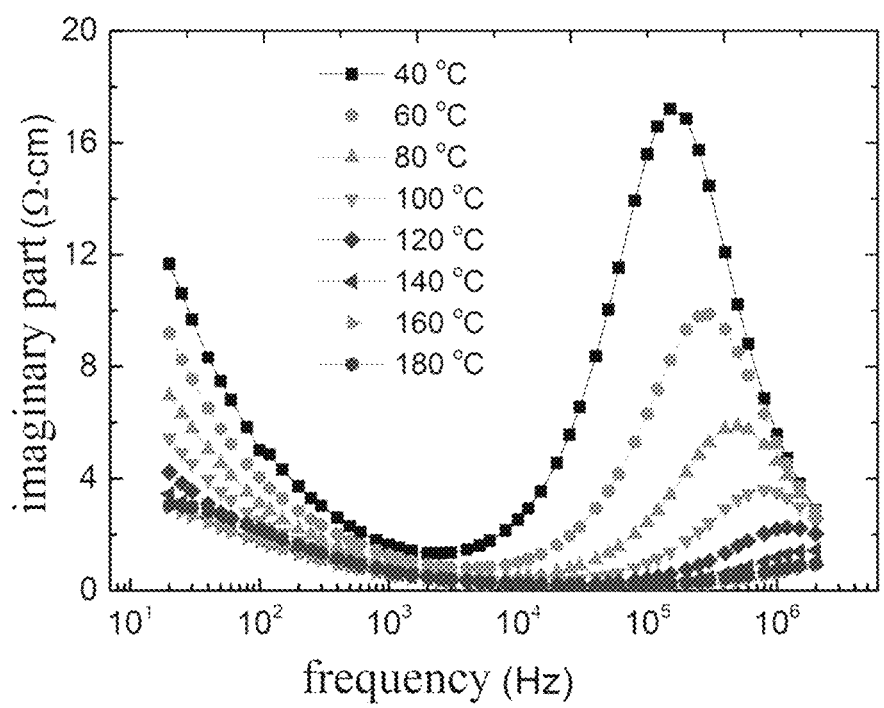
FIG. 18 shows relationship curves of imaginary parts of the impendence spectra measurement results with the measuring frequency, provided in embodiments of the present disclosure.

FIG. 18 shows relationship curves of imaginary parts of the impendence spectra with frequencies, from which it can be seen that there is only one single peak in the high frequency region, suggesting that only one kind of ion is involved in the conduction. Moreover, the asymmetrical shape of the single peak suggests that there is no interference from the inductive effect.

Figure 19:
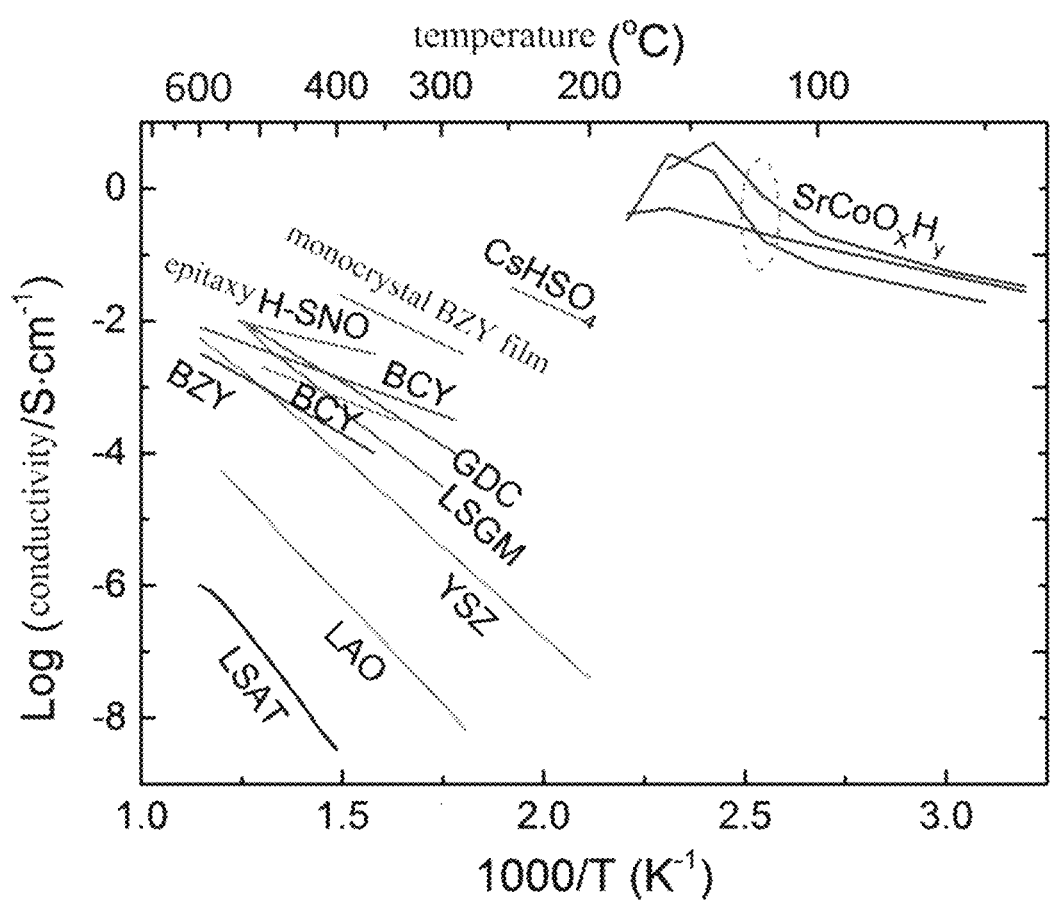
FIG. 19 shows a comparison of the ion conductivity of $ABO_xH_y$ with other different electrolytes.

FIG. 19 shows an ion conductivity comparison of the $SrCoO_xH_y$ with other electrolytes, for which it can be seen that the $SrCoO_xH_y$ has an excellent ion conductivity at a low temperature region (below 200° C.). Therefore, in the solid-state fuel battery provided in embodiments of the present disclosure, the solid-state electrolyte 120 has a relatively low working temperature and can be worked at a temperature blow 200° C.

In the present disclosure, a novel solid-state fuel battery electrolyte $SrCoO_xH_y$ is made by the method for regulating the gating voltage applied to the ionic liquid. A large number of H ions exist in the $SrCoO_xH_y$, and the Co—O octahedron and the Co—O tetrahedron in this crystal structure are twisted by large angles due to the formation of the H—O bond. In addition, a large number of vacancies exist in this structure to provide space and channels for the torsion of the H—O bonds and the transport of the hydrogen ions. The experimental result of the present disclosure demonstrates that the solid-state fuel battery electrolyte $SrCoO_xH_y$ has a very high hydrogen ion conductivity at a low temperature region (from room temperature to 180° C.). Therefore, the solid-state fuel battery adopting the electrolyte provided in the present disclosure has a relatively high H ion conductivity and lower working temperature.

What is described above are only several implementations of the present application, and these embodiments are specific and detailed, but not intended to limit the patent scope of the present application. It should be understood by the skilled in the art that various modifications and improvements can be made without departing from the conception of the present application, and all fall within the protection scope of the present application. It will also be appreciated that some of the steps of the methods of the present application may be performed in parallel or in a different order than illustrated. Therefore, the patent protection scope of the present application is defined by the appended claims.

What is claimed is:

1. A solid-state fuel battery, comprising:
an anode;
a cathode spaced from the anode; and
a solid-state electrolyte disposed between the anode and the cathode;
wherein a material of the solid-state electrolyte is a hydrogen-containing transition metal oxide having a structural formula of $ABO_xH_y$, wherein A is one or more of alkaline earth metal elements and rare-earth metal elements, B is transition metal element Co, x is a numeric value in a range of 1 to 3, and y is a numeric value greater than 0 and smaller than or equal to 2.5.

2. The solid-state fuel battery of claim 1, wherein the alkaline earth metal elements comprise Be, Mg, Ca, Sr, and Ba, and the rare-earth metal elements comprise La, Ce, Pr, Nd, Pm, Sm, Eu, Gd, Tb, Dy, Ho, Er, Tm, and Yb.

3. The solid-state fuel battery of claim 1, wherein A is alkaline earth metal element Sr.

4. The solid-state fuel battery of claim 3, wherein x is 2.5.

5. A method for making the solid-state fuel battery of claim 1, comprising:
providing the anode;
providing the solid-state electrolyte, comprising:
providing a transition metal oxide having a structural formula of $ABO_z$, wherein z is greater than or equal to 2 and smaller than or equal to 3;
soaking the transition metal oxide with an ionic liquid, wherein the ionic liquid is capable of providing hydrogen ions and oxygen ions under an action of an electric field; and
applying an electric field to the transition metal oxide to cause the hydrogen ions in the ionic liquid to insert into the transition metal oxide;
providing the cathode; and
assembling the anode, the solid-state electrolyte, and the cathode by disposing the solid-state electrolyte between the anode and the cathode.

6. The method of claim 5, wherein the providing the transition metal oxide comprises:
providing a substrate;
depositing a film of the transition metal oxide having a structural formula of $ABO_z$ onto a surface of the substrate; and
forming a first electrode on a surface of the film of the transition metal oxide.

7. The method of claim 6, wherein the substrate is one of a ceramic substrate, a silicon substrate, a glass substrate, a metal substrate, or a polymer.

8. The method of claim 6, wherein the film of the transition metal oxide is obtained via an epitaxial growth on the substrate by using a pulsed laser deposition method.

9. The method of claim 6, wherein the first electrode contacts the film of the transition metal oxide to form a bottom electrode.

10. The method of claim 6, wherein the applying the electric field to the transition metal oxide comprises:
providing a second electrode and a power source;
spacing the second electrode from the first electrode, and connecting the second electrode and the first electrode electrically and respectively to the power source;
soaking the second electrode with the ionic liquid and applying an electric field in a direction from the second electrode to the first electrode by the power source.

11. The method of claim 6, wherein a structural form of the solid-state electrolyte comprises a film, a powder, a polycrystal or monocrystal bulk material, a nano-structure, and a composite material.

* * * * *